(12) United States Patent
Coen et al.

(10) Patent No.: US 7,353,226 B2
(45) Date of Patent: Apr. 1, 2008

(54) SYSTEMS AND METHODS FOR PERFORMING SCHEMA MATCHING WITH DATA DICTIONARIES

(75) Inventors: Gary A. Coen, Bellevue, WA (US); Ping Xue, Redmond, WA (US)

(73) Assignee: The Boeing Company, Chicago, IL (US)

( * ) Notice: Subject to any disclaimer, the term of this patent is extended or adjusted under 35 U.S.C. 154(b) by 391 days.

(21) Appl. No.: 11/113,374

(22) Filed: Apr. 22, 2005

(65) Prior Publication Data
US 2006/0242142 A1    Oct. 26, 2006

(51) Int. Cl.
*G06F 7/00* (2006.01)
(52) U.S. Cl. .......................................................... 707/6
(58) Field of Classification Search ...................... 707/6
See application file for complete search history.

(56) References Cited

U.S. PATENT DOCUMENTS

| 6,446,081 B1 | 9/2002 | Preston |
| 2002/0042793 A1* | 4/2002 | Choi ............................. 707/6 |
| 2003/0120651 A1* | 6/2003 | Berstein et al. ................ 707/6 |
| 2005/0278139 A1* | 12/2005 | Glaenzer et al. ............ 702/179 |

OTHER PUBLICATIONS

Senellart et al., Automatic Discovery of Similar Words, Survey of Text Mining, Springer-Verlag, pp. 25-43, 2003.*
Rahm et al., VLDB Journal, 10:334-350, 2001.*
Do et al., Proceedings of the 28th VLDB Conference, Hong Kong. China 2002, pp. 1-12.*
Do et al., Web Databases and Web Services 2002, A.B. Chaudhri et al. (Eds.), LNCS 2593, pp. 221-237, 2003.*
Erhard Rahm, Philip A. Bernstein; A survey of approaches to automatic schema matching; The VLDB Journal 10: 334-350, 2001.
Gary Coen; Dictionaries and lexical graphs; Applications of Natural Language to Information systems; Ana Moreno and Reind P. van de Ried. (Eds.); Bonn, Germany; 2001.
Gary Coen; Database Lexicography: Data and Knowledge Engineering (42:3); 2002.

* cited by examiner

*Primary Examiner*—Cheyne D. Ly
(74) *Attorney, Agent, or Firm*—Lee & Hayes, PLLC

(57) ABSTRACT

Systems and methods for performing schema matching of multiple data dictionaries. Lexical graphs are generated for two or more data dictionaries. The lexical graphs include terms with definitions and identified links between terms. A data processing device determines if matches occur between the generated lexical graphs and outputs the result of the determination.

20 Claims, 7 Drawing Sheets

| TERM | DEFINITION | DD |
|------|------------|-----|
|      |            |     |

FIG. 7.

SYSTEMS AND METHODS FOR PERFORMING SCHEMA MATCHING WITH DATA DICTIONARIES

FIELD OF THE INVENTION

This invention relates generally to computers and, more specifically, to database analysis systems and methods.

BACKGROUND OF THE INVENTION

A namespace is a bounded domain of names constructed according to one or more formation rules. Each name in the namespace typically yields a unique denotation within the scope of its domain. Namespaces abound in computing. For example, table names in a relational database, and member variables in a UML (Unified Modeling Language), Java, or C++ class constitute namespaces. For that matter, the names of all computer languages also constitute a namespace.

The practical use for namespaces in computer science has been to effect modularity. Namespaces are important to class encapsulations, generic programming, software modules, compilation units, and a variety of other artifacts of contemporary computing. Any namespace may contain an inventory of unique identifiers, each with discrete semantics. This makes it possible for a particular name to recur in multiple namespaces with a different denotation in each. Whenever a compiler, linker, interpreter, or database management system calls for a function or an instance of a particular element type, that request is satisfied using denotational semantics from an appropriate namespace.

Namespaces organize complexity. A namespace, for instance, may contain one or more other namespaces. For example, a column in a relational database table constitutes a namespace within a namespace. The type of a class member variable in a UML model may encapsulate a local namespace of types and functions. Likewise, a Java or C++ class contains a local namespace for its member functions, and each method described therein may contain yet another namespace for its own local variables.

A particular name may occur unambiguously in multiple namespaces. In computing environments where multiple namespaces exist, logical distinctions between them are typically maintained by the use of scope identifiers indicating how to resolve the identity of a name across namespaces. Compilers, linkers, interpreters, and database management systems encode the formation rules by which names are composed, and thus resolve such requests appropriately. In this way, the unique denotation of a name is maintained across namespaces.

Frequently, however, it is desirable to translate between namespaces. In multiple system contexts like data warehousing, e-commerce, web services, system-of-system engineering, and others, it is regularly necessary to correlate names with equivalent denotational semantics across namespaces. Given a name and its denotation from one namespace, the necessary operation discovers a name with equivalent denotational semantics in another. Usually this discovery enables data re-use and system interoperability. Unfortunately, the discovery operation resists automation. Today, in fact, it is habitually performed exclusively as a time-consuming, error-prone, manual task, one that has become a principle cost driver for computing in multiple system contexts. Since modern computing routinely involves multiple systems, this cost can be sufficiently high to impede progress.

SUMMARY

The present invention is directed to systems and methods adapted to enable data re-use and system interoperability across multiple systems. More specifically, embodiments of the invention are adapted to efficiently compare and analyze multiple namespaces, including translating between namespaces instantiated in the form of database schema, an operation otherwise known as schema matching. Embodiments of the invention discover candidate matches for individual schema elements. Such embodiments can be characterized as linguistic schema matching, because they interpret information encoded in data dictionary definitions in order to compare metadata elements across schema for equivalent denotational semantics.

In one embodiment, an apparatus includes an output device, an interface device, and a data processing device that is in communication with the output device and the interface device. The data processing device generates lexical graphs for two or more data dictionaries. The lexical graphs include terms with definitions and identified links between terms. An example of the mathematical definition of lexical graphs is presented in the paper titled "Dictionaries and Lexical Graphs," author Gary Coen, 2001. The data processing device determines if matches occur between the generated lexical graphs and presents an image to the output device based on the determined matches.

BRIEF DESCRIPTION OF THE DRAWINGS

Preferred and alternate embodiments of the present invention are described in detail below with reference to the following drawings.

FIG. 7 a screen shot of an example output generated by the system of FIG. 1.

DETAILED DESCRIPTION

Figure 1:
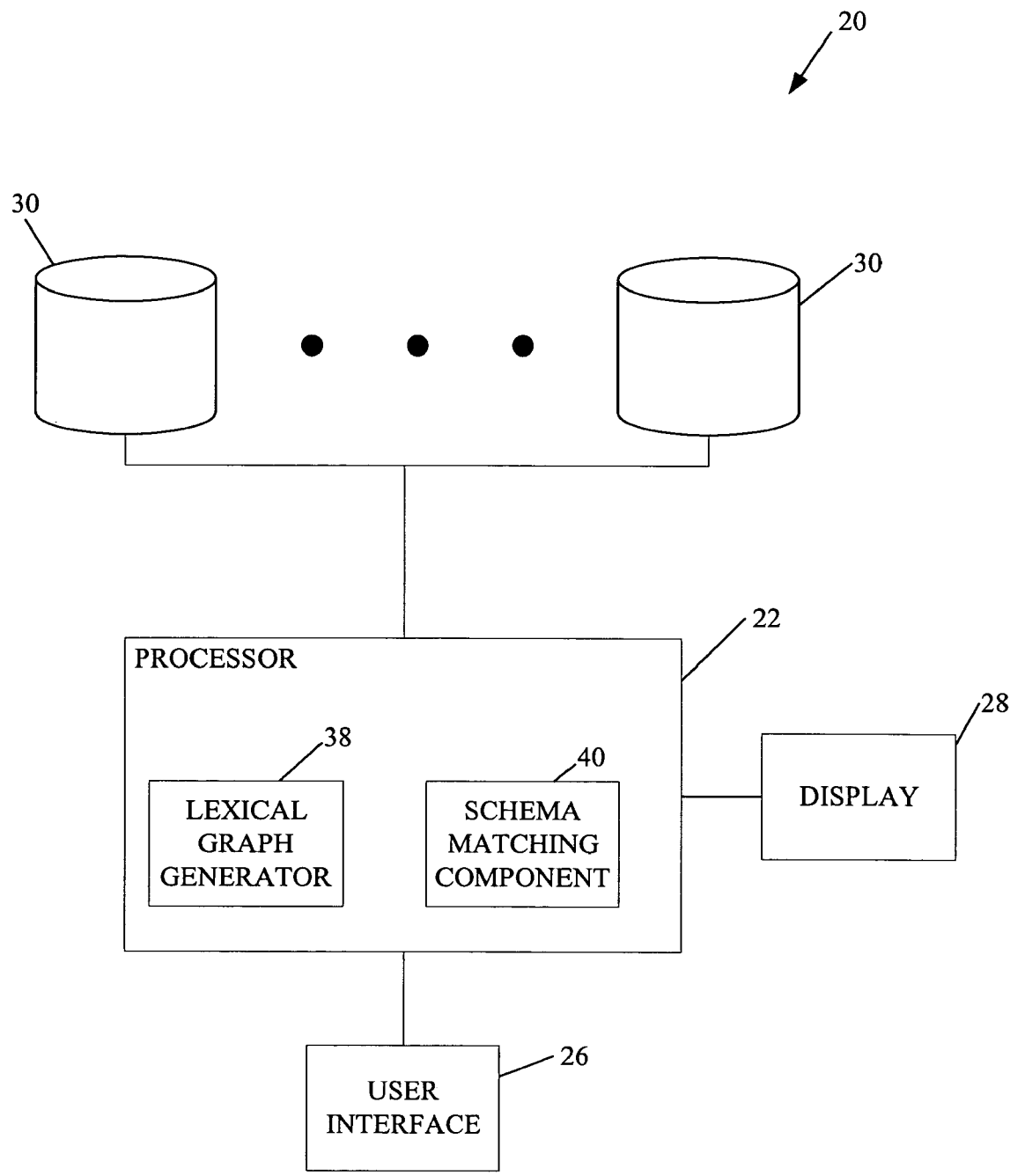
FIG. 1 is a block diagram of an example system formed in accordance with an embodiment of the present invention.

The present invention relates to systems and methods adapted to efficiently compare and analyze multiple namespaces, including schema matching. Many specific details of certain embodiments of the invention are set forth in the following description and in FIGS. 1-7 to provide a thorough understanding of such embodiments. One skilled in the art, however, will understand that the present invention may have additional embodiments, or that the present invention may be practiced without several of the details described in the following description.

Generally, a database schema can be considered a namespace. A computing architecture is typically defined in terms of system elements, interfaces, processes, constraints, and behaviors, including subsystems and their allocation to tasks and processors. Architectures often include a database, a persistent repository of information encoded in formatted data and stored in an electronic file system. Named metadata define the design of the data and thus the semantics of each data element. Hence, the data design, often called the database schema, may be a bounded domain of names constructed in a rule-governed way to support the architecture, each name yielding a unique denotation within the database. In this way, a database schema clearly embodies a namespace.

Linguistic, Element-level, Schema-based Schema Matching

Embodiments of the present invention may include an algorithm that can be characterized as linguistic, element-level, and schema-based. The algorithm is element-level because it discovers candidate matches for individual schema (data) elements, as opposed to complexes of elements. It is schema-based because it considers only schema information and ignores instance data. It is linguistic because it interprets the information encoded in data dictionary definitions in order to compare metadata elements across schema for equivalent denotational semantics. The success of schema matching performed with a linguistic, element-level, and schema-based method is directly related to the integrity of metadata description of the database schemas involved.

Interpretation of a data value may depend on the meaning of the metadata type encoding that value. Moreover, the data dictionary is the conventional repository for metadata description. In its highest conception, it records this meaning and other information so that data semantics may be shared consistently throughout the architecture. Formal methods for managing the shared meanings that constitute lexicographic knowledge in metadata description are provided by database lexicography. Database lexicography exploits the data dictionary as a metadata resource responsible for publishing a controlled terminology as well as the information structure of instance data in a database.

Lexicographic Constraints

A data dictionary is to a database as a map is to terrain. Because the accuracy of schema matching is determined by the quality of metadata description, data dictionary information properties are central to this approach. In brief, data dictionary entries should define metadata as precisely and succinctly as possible, and say no more. For example, each entry should consist of (at least) a metadata term and its definition, and each type of entry has specific information requirements. Commonplace properties of metadata include inheritance, aggregation, and existential entailment, and data dictionaries with integrity of description encode this information systematically. Finally, data dictionaries suitable for schema matching represent lexical graphs free of namespace overloading.

Namespace Constraints

A data dictionary typically has properties that distinguish it from other document types. An algorithm that interprets the information encoded in a data dictionary identifies these properties and accommodates them. Like any other document, a data dictionary employs standard lexis in normal patterns of exposition according to everyday language use. As a lexicon, however, a data dictionary also defines new meanings: it combines standard lexis in new ways to identify autonomous lexical material and its denotational semantics. The scope of this new lexical material extends throughout the data dictionary, and the network of lexical dependency thus created may be pervasive. In fact, the dependency architecture may influence interpretation of any metadata element.

Typically, a data dictionary presents lexical material in ordinary language correlating elements of a controlled terminology with definite descriptions that are true within the boundaries of the associated schema. In other words, a data dictionary augments ordinary language lexis. When its controlled terminology occurs without overloading in the otherwise ordinary language of its definitions, denotations of the controlled terminology contribute alongside ordinary language to define meaning. However, when overloading occurs in a data dictionary definition, it creates a naming conflict between ordinary language and the dictionary's metadata description. Under these circumstances, the denotational semantics specified in the data dictionary takes precedence over ordinary language semantics. As used in this patent application, this principle is known as overload precedence (or overloading). For example, imagine a bookstore data schema in which the following meta data descriptions occur: Book; Publisher; and Price. All three elements have definitions. In particurlar, Price is defined as the result of a computation that includes the single term weeks-in-inventory, which is another meta data element. In this case, Price has overload precedence over the every day meaning of Price.

Overload precedence complicates data dictionary processing. Even modestly proportioned dictionaries stress attentional and motivational resources of human analysts. Each metadata element extends or, potentially, overrides ordinary language use, and any definition may reuse one or more other metadata elements. For interpretation, overload precedence applies equally when the naming conflict involves a collision between single words, word sequences, or their combination.

FIG. 1 illustrates an example system environment 20 in which the present invention performs its operations. The environment 20 includes a computer processor 22 that performs schema matching on a plurality of data dictionaries from multiple databases 30. The processor 22 is coupled to a user interface device 26 and a display 28. The user interface 26 may be any of a number of off-the-shelf user interfaces devices, such as a mouse, a keyboard, a writing pad, a touch screen or any other similar input/output device. The processor 22 includes a lexical graph generator 38 and a schema matching component 40. The lexical graph generator 38 generates lexical graphs for the data dictionaries in the databases 30 and the schema matching component 40 performs schema matching between the generated lexical graphs. The generator 38 and component 40 may be application programs implemented in software and executed by the processor 22. The application programs may be stored in memory (not shown), such as RAM or ROM, that is associated with the processor 22.

Figure 2:
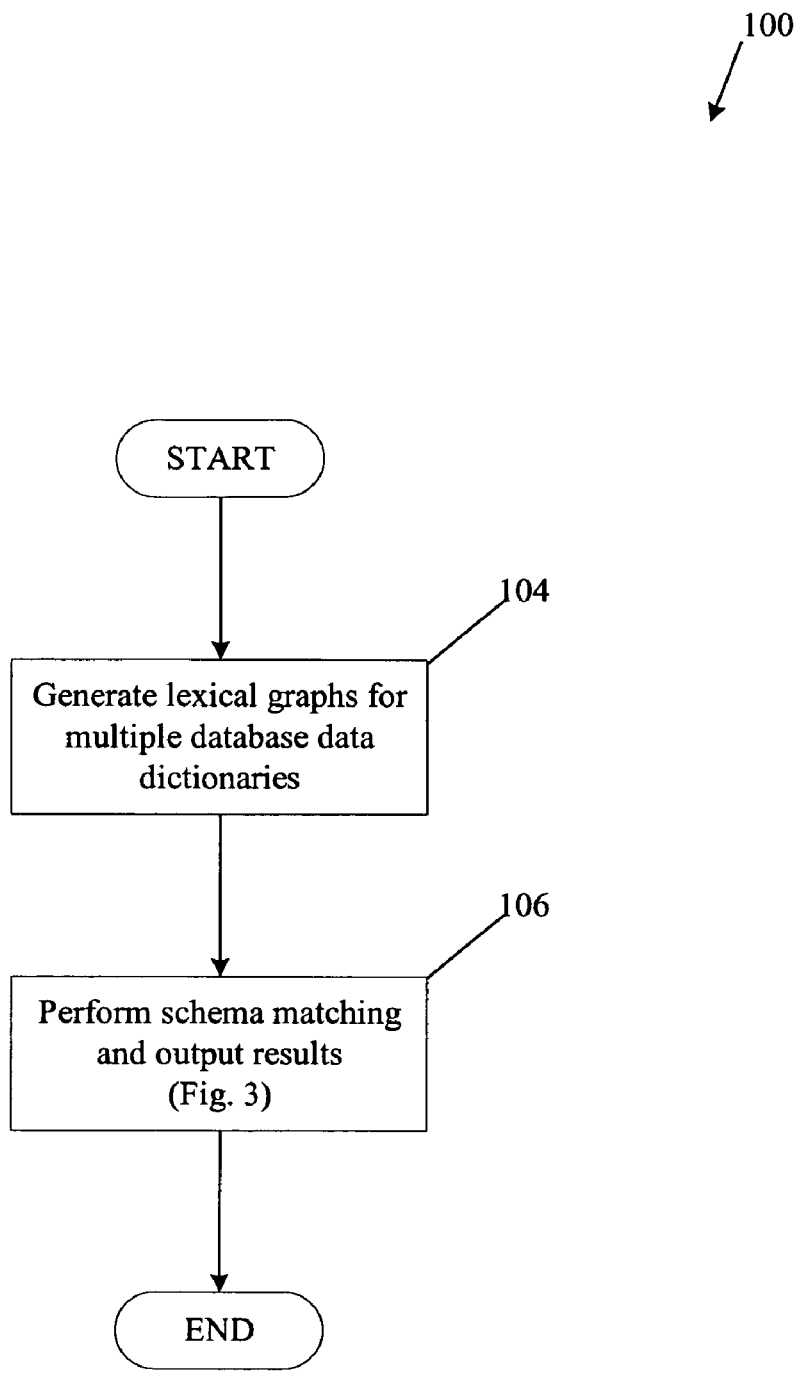
FIGS. 2-6 are flow diagrams that show an example process performed by the system shown in FIG. 1.

FIGS. 2-6 illustrate processes performed by the processor 22. As shown in FIG. 2, the processor 22 performs a process 100 using the lexical graph generator 38 and the schema matching component 40. First, at block 104, the lexical graph generator 38 generates lexical graphs for multiple database dictionaries. At a block 106, the schema matching component 40 performs schema matching and outputs results to the display 28 or other output devices, such as a printer. Schema matching is described in more detail in FIG. 3.

Figure 3:
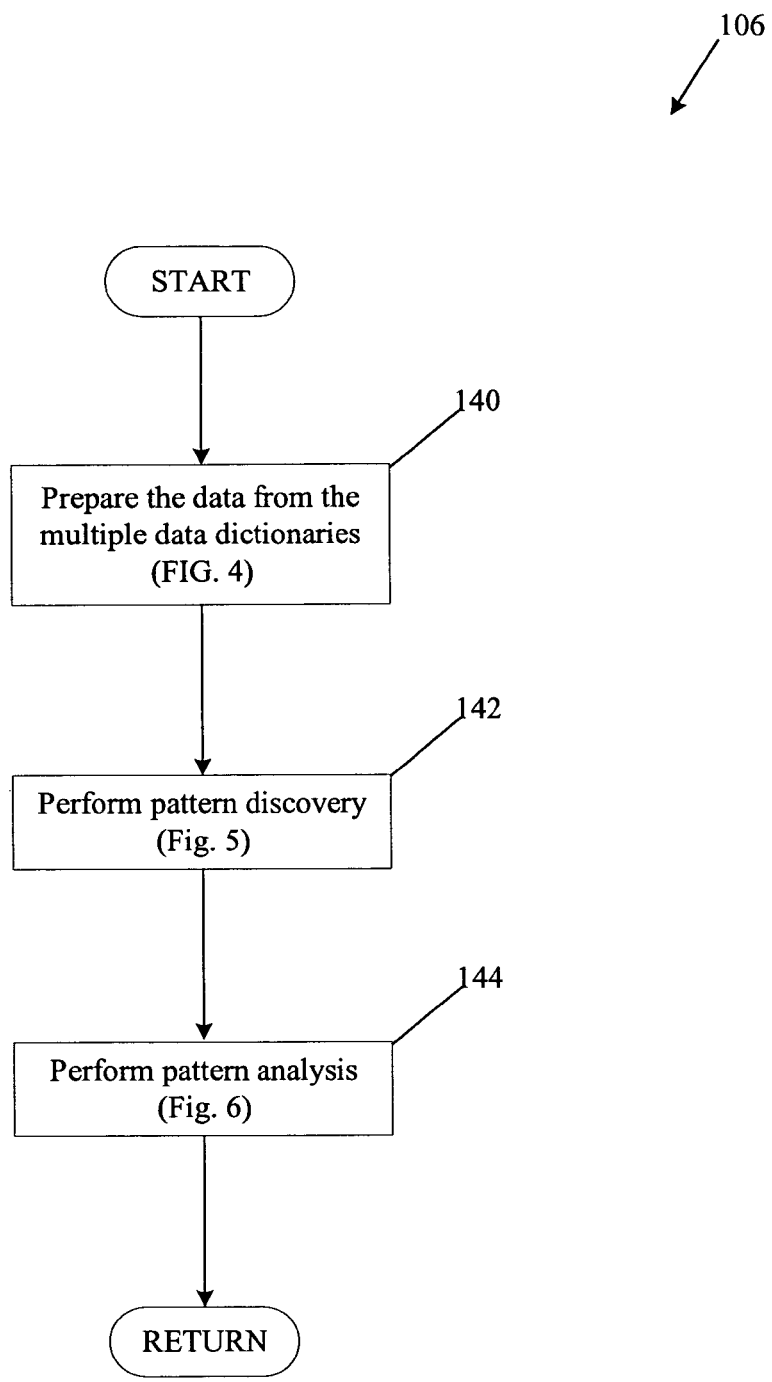

As shown in FIG. 3, the schema matching performed at the block 106 begins at a block 140, whereby elements of the metadata from the multiple data dictionaries are prepared for processing. The preparation performed at the block 140 is described in more detail in FIG. 4. At a block 142, pattern discovery is performed on the prepared data performed at the block 140. Pattern discovery is described in more detail in FIG. 5. Then, at a block 144, the schema matching component 40 performs pattern analysis based on the pattern discovery performed at the block 142. Pattern analysis is described in more detail in FIG. 6.

Figure 4:
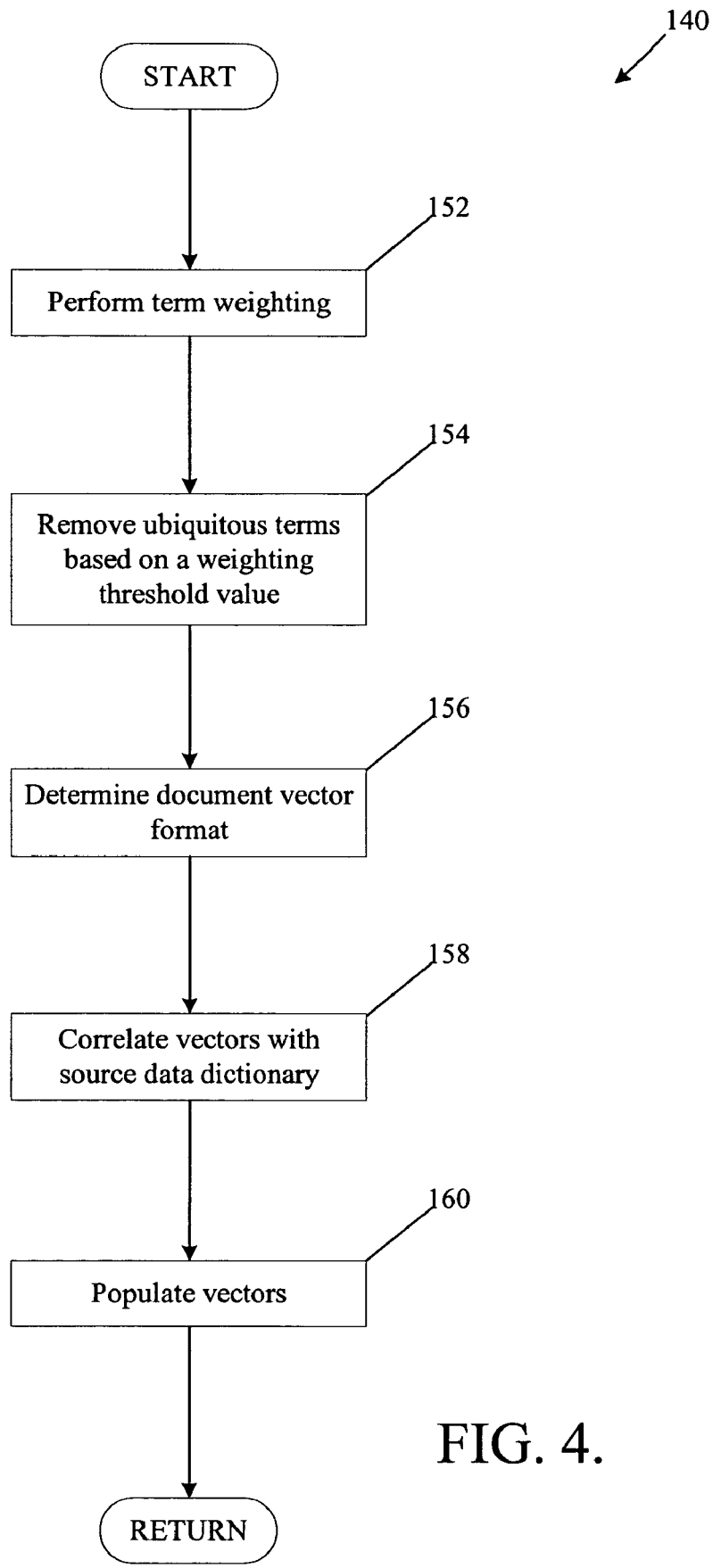

As shown in FIG. 4, the process of preparing the data (block 140) of FIG. 3 begins by performing weighting of terms within each of the data dictionaries, block 152. At a block 154, ubiquitous terms are removed based on a predefined weighting threshold value. In one embodiment, terms are weighted based on number of times they appear in the data dictionary. Thus, terms that appear frequently are considered ubiquitous terms and are not important to further analysis and therefore are removed. Examples of ubiquitous terms are the words "the", "a", etc. Next at a block 156, the format of the document vector is determined based on the remaining terms resulting after ubiquitous term removal (block 154). The actions occurring at the block 156 determine the size and structure of the document vector, but do not populate the document vectors for each term in each of the data dictionaries. At a block 158, document vectors are populated with the original data from the data dictionary in which they are associated. This includes associating a document vector with a source data dictionary. Next at a block 160, the document vectors are populated (see below). Populating respects overloading.

Figure 5:
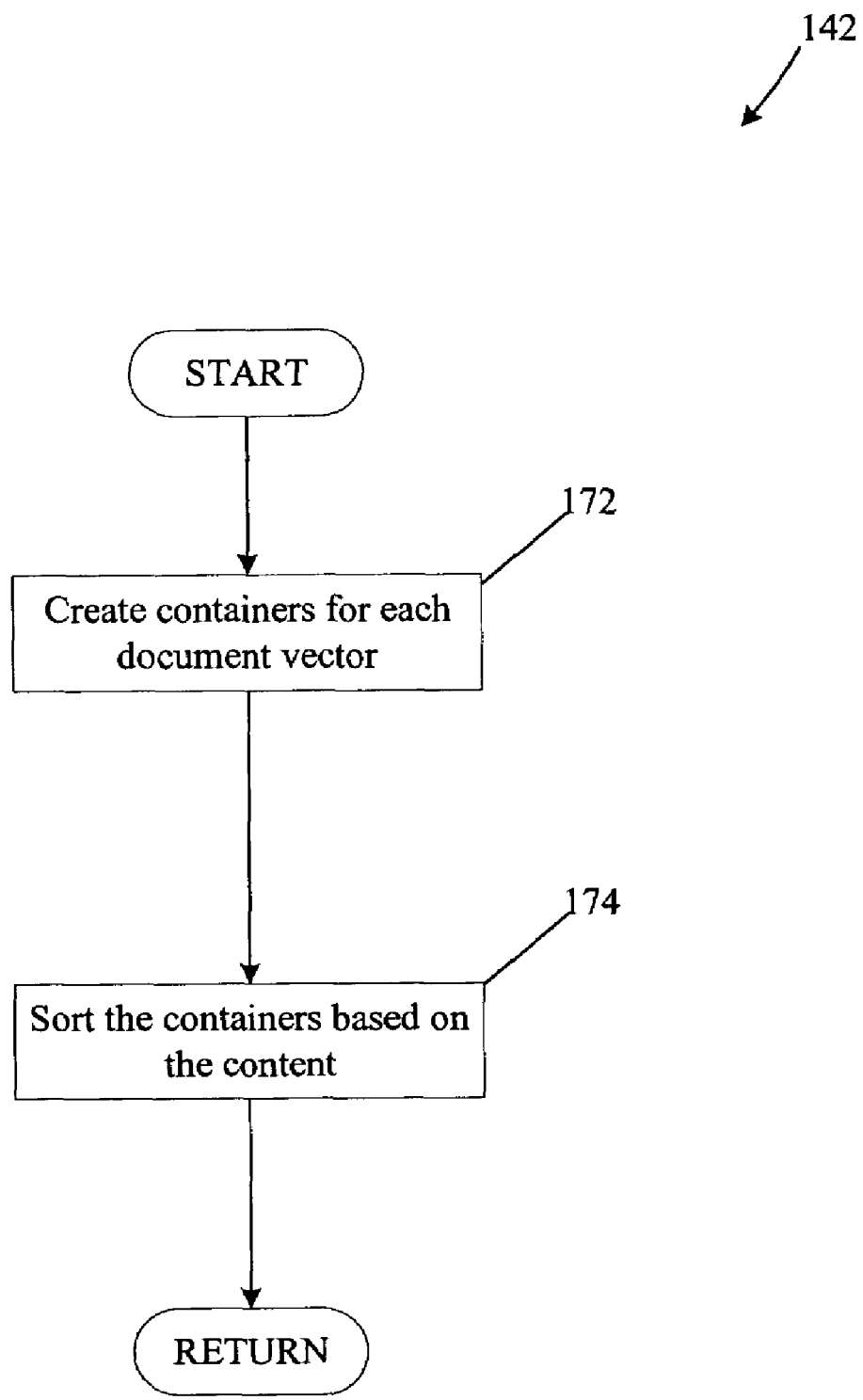

As shown in FIG. 5, the process of performing pattern discovery (block 142) of FIG. 3 begins at a block 172, whereby a container is created for each document vector. The container is an object that holds the document vector and provides arithmetic operations on the held document vector to compare it with other containers of the same type. The container includes behavioral information. At a block 174, the containers are sorted based on the content included within each container. This is essentially a mathematical sorting process and will be described in more detail.

Figure 6:
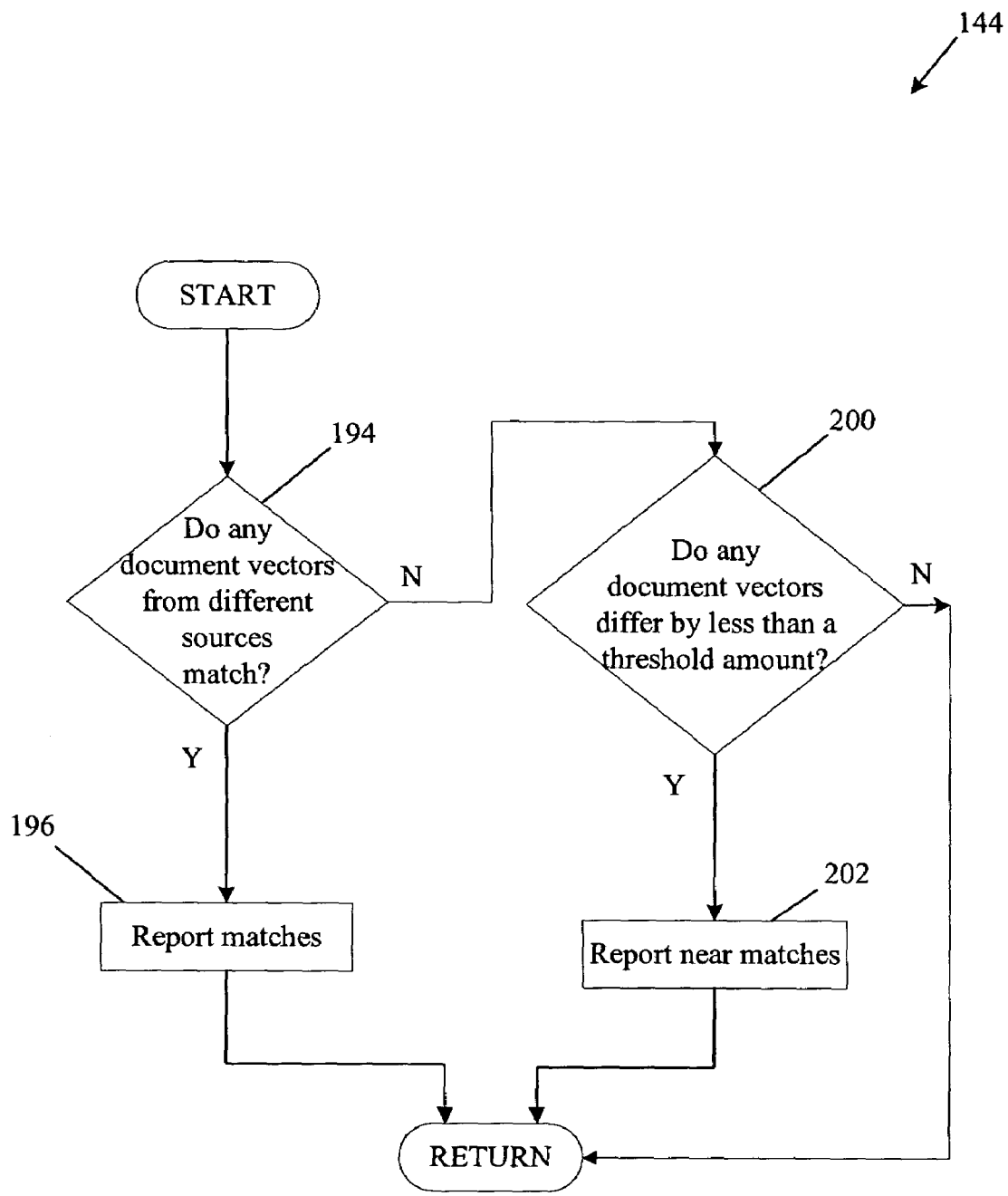

As shown in FIG. 6, the process of performing pattern analysis (block 144) of FIG. 3 begins at a decision block 194 that determines if any document vectors from different source data dictionaries (block 158) match. If matches occur from the decision performed at the decision block 194, the matches are reported at the block 196. Match reporting will be described in more detail with regard to FIG. 7. If as determined at the decision block 194, there are no matching document vectors from different source data dictionaries, the process continues on to a decision block 200. At the decision block 200, the process determines if any document vectors from different source data dictionaries differ by less than a threshold amount. If none of the document vectors differ by less than a threshold amount, the process is complete and returns. If at the decision block 200 any document vectors do differ by less than the threshold amount, these document vectors are reported to the user at a block 202. After the report of the matches and near matches occur at the blocks 196 and 202, the process is complete.

To reiterate, an embodiment of the present invention treats each data dictionary entry (metadata element) as an individual document and computes an ordered list of terms to represent its meaning. Initially, metadata describing two database schemas is converted into term lists tagged with their schema of origin. Next, the method applies an association measure to the set of term lists to sort it. Finally, the sorted set is evaluated to identify sequential pairs, each from a different schema, with similarity sufficient to suggest equivalence. These pairs are then identified as likely candidates for inter-schema semantic equivalence. A detailed description of this method follows.

Data Preparation

Data preparation (block 140) takes as input the two or more data dictionaries involved in schema matching, each a set of term-definition pairs. Initially, the entries are marked to identify schema of origin. The process then rewrites each pair, unambiguously tagging every content word with an underlying, canonical form representing conceptual content. This interprets meaning and dispels any lexical ambiguity. For each newly rewritten dictionary, an exhaustive lexical dependency analysis is performed to identify how coupling affects meaning and provide a data structure to guide the instantiation of document vectors.

Pattern Discovery

Once conceptual content and information structure of each dictionary are identified, the algorithm assembles metadata representations. For each dictionary, it lists the unique canonical forms appearing in a set of definiens rewritten during the data preparation phase. These lists account for each multi-word definiendum as a single multi-word item, thus respecting overload precedence. For each data dictionary, the result is an inventory of index terms, a set of canonical forms encoding metadata and incidental matter.

Next, the lists of index terms and the sets of rewritten definiens are combined to create a virtual namespace in which the formerly independent namespaces are local. This combined index term list becomes the inventory of index terms available. Similarly, the combined definiens set becomes the document collection. Document vectors will be constructed from these data structures.

Term Weighting

As noted above, embodiments of the present invention employ term weighting techniques to optimize statistical discrimination between documents. Term weighting may, for example, be based on single term statistics. In one particular embodiment, a process first considers each index term as a random variable, and computes an entropy value with respect to its occurrence in the definiens set, thus identifying the certainty of term-document correlation for each index term. The computation customizes Shannon's formula as illustrated in Definition 1:

Definition 1:

$$H(W) = -\sum_{w \in V(W)} P(w) \log P(w)$$

Here W is the inventory of index terms, w is a particular term from that inventory, and entropy is a function of probability distribution functions. Since probabilities lie in the interval between zero and one, their logarithms are always negative, and the minus sign ensures that resultant entropies are always positive. In the language of information theory, H(w) increases with the amount of uncertainty contained in w, and the process employs this as a measure relating index term to definiens. When H(w) is high, there is uncertainty about the correlation between w and elements of the definiens set; as H(w) decreases, certainty increases until the limit condition in which w correlates with exactly one definiens, the one in which w occurs.

Term weighting combines term certainty with term informativeness, another single term statistic. Informativeness, I(w), encapsulates a computation on term frequency, term distribution, and size of the document collection in a function that increases with w's occurrence across elements of the definiens set:

Definition 2:

$$I(w) = \log\left[n - \log\left[\frac{f(w)}{df(w)}\right]\right]$$

Ultimately, the schema matching algorithm formulates term weighting, W(w), as the product of term certainty and term informativeness. The formula is given in Definition 3:

$$W(w)=H(w)I(w) \qquad \text{Definition 3:}$$

Term weighting is intended to represent term significance within the document collection. It compensates for the fact that longer documents would otherwise receive more weight in equivalence comparisons since they are likely to share more index terms. In support of schema matching, term weighting provides the means to induce a weak partial order on a document collection, thus discriminating between its elements. The benefit this provides is illustrated in Table 1, which presents term statistics for a fragment of a data dictionary of 1,000 entries and 20,000 words. Note that the entries are sorted in ascending order according to W(w), illustrating the ordering effect of term weighting. As specified in Within this interval, term weighting is minimal when a term occurs exactly once within a single document of the document collection, and it is maximal when it occurs in every document. Within this interval, term weighting is a function of frequency and distribution, with distribution as the more heavily weighted factor.

TABLE 1

| n | f(w) | df(w) | L(w) | P(w) | H(f) | W(w) |
|---|------|-------|------|------|------|------|
| 1000 | 1 | 1 | 9.965784 | 5E−05 | 0.00022 | 0.002143 |
| 1000 | 2 | 1 | 9.964341 | 1E−04 | 0.0004 | 0.003986 |
| 1000 | 2 | 2 | 9.965784 | 1E−04 | 0.0004 | 0.003986 |
| 1000 | 3 | 1 | 9.963496 | 2E−04 | 0.00057 | 0.005716 |
| 1000 | 3 | 2 | 9.96494 | 2E−04 | 0.00057 | 0.005716 |
| 1000 | 3 | 3 | 9.965784 | 2E−04 | 0.00057 | 0.005716 |
| 1000 | 4 | 1 | 9.962896 | 2E−04 | 0.00074 | 0.00737 |
| 1000 | 4 | 2 | 9.964341 | 2E−04 | 0.00074 | 0.007372 |
| 1000 | 4 | 3 | 9.965185 | 2E−04 | 0.00074 | 0.007372 |
| 1000 | 4 | 4 | 9.965784 | 2E−04 | 0.00074 | 0.007373 |
| 1000 | 5 | 1 | 9.962431 | 3E−04 | 0.0009 | 0.008971 |
| 1000 | 5 | 2 | 9.963876 | 3E−04 | 0.0009 | 0.008973 |
| 1000 | 5 | 3 | 9.964721 | 3E−04 | 0.0009 | 0.008973 |
| 1000 | 5 | 4 | 9.96532 | 3E−04 | 0.0009 | 0.008974 |
| 1000 | 5 | 5 | 9.965784 | 3E−04 | 0.0009 | 0.008974 |
| 1000 | 1000 | 1 | 9.951335 | 0.05 | 0.06505 | 0.647389 |
| 1000 | 1000 | 1000 | 9.965784 | 0.05 | 0.08506 | 0.648289 |

Defining Document Vector Format

The schema matching component 40 (block 156) establishes a document vector format in two steps. First, the inventory of index terms is filtered to remove ubiquitous elements (block 154). This can be accomplished by removing from W, the inventory of index terms, all w for which df(w)=n. Let T denote the set of remaining index terms after this operation is complete. Then the length of the document vector format can be identified as the cardinality of T, |T|.

Once document vector length is established, full specification of the document vector format lacks only a method by which to correlate the elements of T with the |T| positions available. To accomplish this, the process resorts to term weighting. Starting with the leftmost vector position and proceeding rightward, the index term from T with the highest term weighting is sequentially correlated with the next available position of the vector until each term is correlated with exactly one position. When complete, index terms with the highest term weighting are correlated with the leftmost positions, and those with the lowest weighting are correlated with the rightmost positions. The vector may be ordered in various ways (e.g., highest to lowest with an inverted sort operation).

Instantiating Document Vectors

Once a format is fixed, the schema matching algorithm instantiates document vectors to represent the definiens of the document collection (block 160). Each of these document vectors depicts meaning in the form of its correlated conceptual content. The set of document vectors produced in this way represents the two document collections which, in turn, contain metadata description for the schemas involved in schema matching.

New document vectors are initialized with default values (indicating that no index terms have yet been correlated with the document represented). Iterating through the elements of each data dictionary topology S produced in the data preparation phase, an embodiment of the invention executes the following procedure at each step:

Create and initialize document vector d for the current metadata item M in S
For each index term t, t∈T, in the definiens of M
If t is the definiendum of another element of M
(i) Mark the position in d correlated with t to relate the definiens of M to index term t and
(ii) Mark the position in d correlated with any index term t' for which the document vector representing t is correlated, in this way relating the definiens of M to index terms upon which t depends,
Else mark the position in d correlated with t to relate the definiens of M to index term t
Assign d to represent M
Advance to the next metadata item in S Step (ii) enforces overload precedence in exactly those instances in which it is necessary for interpreting data dictionary entries. By the time that t appears in the enumeration order on elements of S, the document vector associated with each t' upon which t lexically depends will represent the transitive closure of its lexical dependencies. This ensures that the representation for metadata item M includes all the index terms contained in the definiens of M as well as those indirectly referred to there via chains of lexical dependency.

The strategy behind this approach identifies the semantic contribution to M of lexical dependency t to be the definite description specified in the definiens of t. Assuming a species of direct reference logic, this definiens suffices to fix the referent of t in the database schema. If lexical dependency is directly referential in this sense, then the semantic function of t with respect to M must be to import this referent into M's definiens. For the purposes of schema matching, this could be accomplished by assigning to M the representation that results from applying the inclusive OR operator to the document vectors associated with M and t. In this way, the conceptual content of lexical dependent t is a constituent of the representation of M.

Association Measure for Evaluating Similarity

The schema matching process employs document vector equality as its principle association measure. When two documents share exactly the same index terms, they are presumed maximally similar at the level of conceptual content. Document vector equality indicates high potential for equivalent denotational semantics. Conversely, the lower the inventory of shared index terms, the lower the presumption of equivalence. Hence, the basic matching coefficient can be a useful association measure for evaluating document similarity in schema matching.

There are three possible outcomes for each application of this association measure. Trivially, when document vectors representing metadata are different, the metadata involved in the comparison are presumed distinct. More to the point, when document vectors are identical, the metadata are presumed to be meaningfully equivalent. When these metadata originate in the same schema, the comparison may have discovered synonymous metadata, a spurious condition that merits further attention. When these metadata originate in different schema, it is possible the comparison has discovered equivalent metadata across database schema, which is one of the goals of schema matching.

Pattern Analysis

Recall that term weighting is minimal when a term occurs exactly once within a single document of the collection and maximal when it occurs in every one. Low term weighting indicates high term certainty and informativeness as well as a potential for a particular index term to occur uniquely in some particular definiens. In the schema matching process, document vectors embody the discriminatory power of term weighting.

Consider the significance of term weighting when used as the criterion by which document vector elements are correlated with index terms. Since terms with minimal weighting are correlated with leftmost positions in document vectors, leftmost positional values are the most significant indicators of the potential for a unique relation between a particular index term and the document represented. Assuming document vectors to be ordered sets of binary weights, a positive weighting for a leftmost position indicates the relative likelihood of a correlation between w and some element of the definiens set.

Other things being equal, when the document vectors of metadata items share left-most positive values, those metadata are more likely to possess equivalent denotational semantics. To a progressively lesser degree, this observation holds true for shared positive values in a left-to-right iteration of document vector positions. Characteristically, when the document vectors of metadata share all but right-most positive values, those metadata are likely to possess equivalent denotational semantics.

Clearly, document vectors designed in this fashion assign higher significance to values leftward of a particular position and lower significance to values rightward. At a detailed level, document vectors can be realized as bit vectors in which a 0-bit (false) value indicates the absence of the associated index term from the document and a 1-bit (true) value indicates presence of the associated index term. Hence, 0101011001 could be a document vector encoding correlations with a modest set of 10 index terms. Clearly, realization as a bit vector preserves the high-order significance property of the representation (e.g. leftmost bits have higher significance). This insight suggests implementations utilizing user-defined data types that encapsulate bit vector representations and provide arithmetic operators for equality, subtraction, and less-than comparisons. Document vectors implemented in this way can be compared for equality, subtracted one from another, and assembled together in a sorted collection ordered by the less-than relation.

A docvector is a user-defined document vector of the type described in the preceding paragraph. For pattern analysis, the process orders collections of docvectors by the less-than relation in order to arrange those with measurably close values in adjacent or proximal contexts. Once sorted in this manner, the collection is scanned in ascending order. Adjacent docvectors (as well as adjacent groups of docvectors) that are equal in value are treated as either spurious synonyms or schema matches, depending on their schema of origin. This explains the simple cases of pattern analysis.

More complex cases occur when adjacent docvectors (or groups of docvectors) bear close, but unequal, values. In these cases, the process allows for inexact matches by calculating a variance value for the collection of docvectors and allowing as a possible schema match any adjacent values for which the difference is less than the standard deviation. To accomplish this, the mean value of the collection of docvectors is calculated according to the following formula:

Definition 4:

$$\overline{X} = \frac{\sum_{dv \in docvectors} dv}{n}$$

Next, by subtracting the mean from each docvector value it is possible to identify its distance from the mean. Variance is computed by dividing the square of the total of these values by the number of docvectors:

Definition 5:

$$\sigma^2 = \frac{\sum (dv - \overline{X})^2}{n}$$

Finally, the positive square root of variance for the collection is σ, the standard deviation. Whenever the difference between adjacent docvectors (or groups of docvectors) with unequal values from different schema of origin is less than a, the process identifies a potential match, although confidence in this second category of match is less than that for the first.

Figure 7:
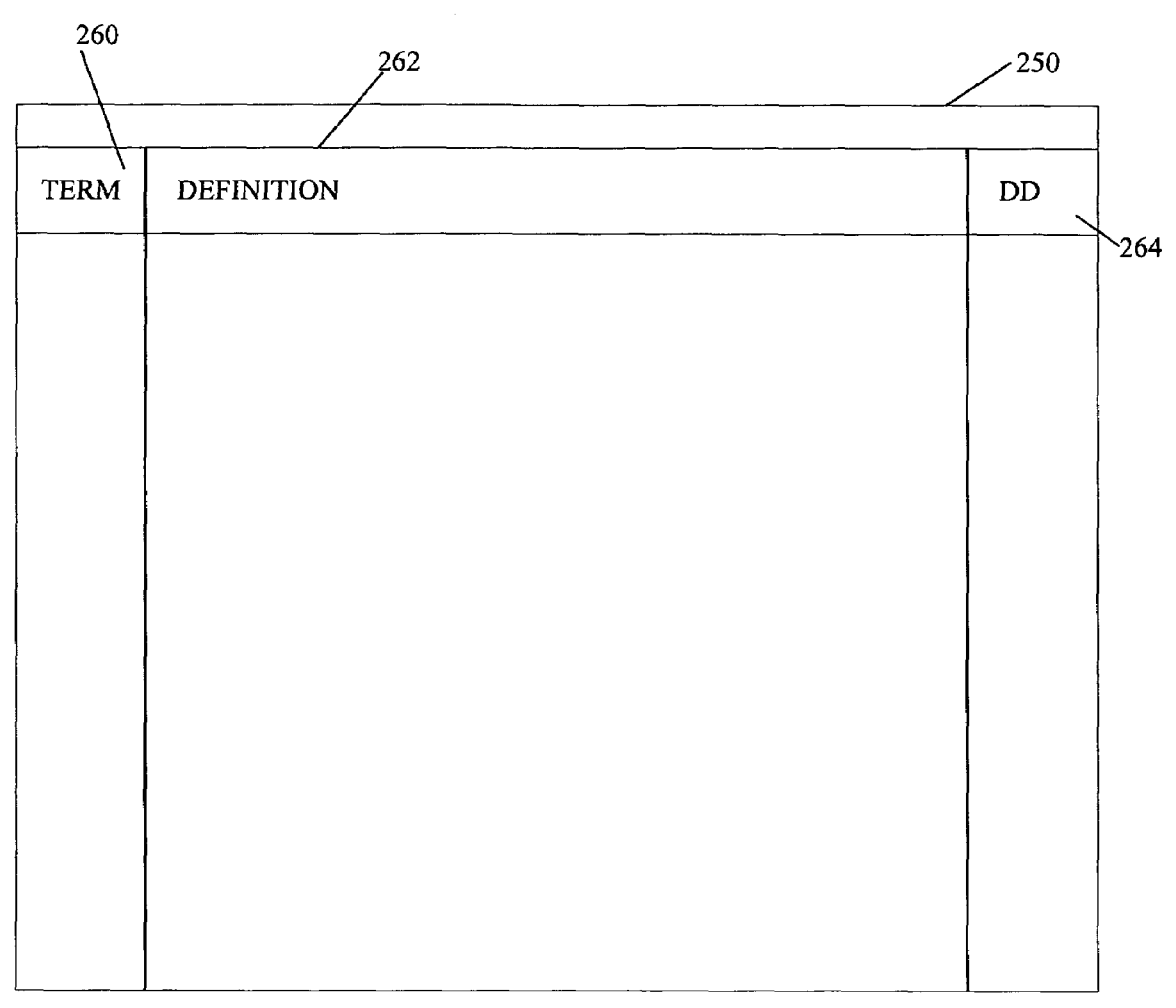

FIG. 7 illustrates an example output generated by the system of FIG. 1. In one embodiment, the output is an image of a table 250 that can be presented on the display 28 (FIG. 1) or output as a hardcopy. The table 250 includes a terms column 260, a definitions column 262, and a data dictionary (DD) column 264. The terms column 260 presents the terms from different data dictionaries having document vectors that match or nearly match (FIG. 6). The definitions that correspond to the presented terms are presented in the definitions column 262 and the DD that is the source of the presented terms is listed in the DD column 264. Thus, the table 250 makes it easy for a user to review and analyze the results of the performed schema matching.

The results (matching/near matching terms) may be presented a number of different ways. For example, the results may be in ascending or descending order of quality of the matching terms (e.g. perfect matches and various levels of near matches). Also, when matching or near matching terms may be presented in the same color, font, or other manner that distinguishes one match from an adjacent match.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method for schema matching with data dictionaries performed on a computing device, the method comprising:

generating lexical graphs for at least two data dictionaries, the lexical graphs including terms with definitions and identified links between terms;

determining matches between the generated lexical graphs, the determining including applying respective weighting values to terms within the lexical graphs, the respective weighting values calculated as a product of a corresponding term certainty and a corresponding term informativeness, wherein each term certainty is based on an entropy function, and wherein each term informativeness is based on a logarithmic function; and wherein:

the entropy function is of the form:

$$H(W) = - \sum_{w \in V(W)} P(w) \log P(w); \text{ and}$$

the logarithmic function is of the form:

$$I(w) = \log\left[n - \log\left[\frac{f(w)}{df(w)}\right]\right]; \text{ and}$$

presenting determined matches by way of an image displayed on an output device.

2. The method of claim 1, wherein determining includes determining a pattern for the lexical graphs and performing pattern analysis of the determined patterns.

3. The method of claim 2, wherein the applying weighting values to terms within the lexical graphs is further based on frequency of use within the respective lexical graph.

4. The method of claim 3, wherein determining a pattern further includes removing terms having weighting values outside of a previously defined weighting threshold limit.

5. The method of claim 4, wherein determining a pattern further includes determining a document vector format based on the remaining terms and associated weighting values.

6. The method of claim 5, wherein determining a pattern further includes correlating document vectors with their source data dictionary.

7. The method of claim 6, wherein determining a pattern further includes performing overloading of term definitions.

8. The method of claim 6, wherein performing pattern analysis includes instantiating document vector objects based on the determined document vector format.

9. The method of claim 8, wherein performing pattern analysis includes sorting the document vector objects and determining if any matches occur between document vector objects correlated with different source data dictionaries.

10. The method of claim 8, wherein performing pattern analysis includes determining if any document vector objects correlated with different source data dictionaries differ by less than a threshold amount.

11. An apparatus including schema matching with data dictionaries, the apparatus comprising:
an output device;
an interface device; and
a data processing device coupled to the output device and the interface device, the data processing device including:
  a first component configured to communicate with at least two data dictionaries;
  a second component configured to generate lexical graphs for the at least two data dictionaries, the lexical graphs including terms with definitions and identified links between terms;
  a third component configured to determine matches between the generated lexical graphs, the third component further configured to apply respective weighting values to terms within the lexical graphs, each weighting value calculated as a product of:
    a first function of the form:

$$H(W) = - \sum_{w \in V(W)} P(w) \log P(w)$$

and a second function of the form:

$$I(w) = \log\left[n - \log\left[\frac{f(w)}{df(w)}\right]\right]; \text{ and}$$

a display processing component configured to generate a display based on the determined matches from the third component and transmit the image to the output device.

12. The apparatus of claim 11, wherein the third component includes a first subcomponent configured to determine a pattern for the lexical graphs and a second subcomponent configured to perform pattern analysis of the determined patterns.

13. The apparatus of claim 12, wherein the first subcomponent is further configured to apply the weighting values to terms within the lexical graphs based on frequency of use within the respective lexical graph.

14. The apparatus of claim 13, wherein the first subcomponent is further configured to remove terms having weighting values outside of a previously defined weighting threshold limit.

15. The apparatus of claim 14, wherein the first subcomponent is further configured to determine a document vector format based on the remaining terms and associated weighting values.

16. The apparatus of claim 15, wherein the first subcomponent is further configured to correlate document vectors with their source data dictionary.

17. The apparatus of claim 16, wherein the first subcomponent is further configured to perform overloading of term definitions.

18. The apparatus of claim 16, wherein performing pattern analysis includes instantiating document vector objects based on the determined document vector format.

19. The apparatus of claim 18, wherein the second subcomponent is further configured to sort the document vector objects and determine if any matches occur between document vector objects correlated with different source data dictionaries.

20. The apparatus of claim 18, wherein the second subcomponent is further configured to determine if any document vector objects correlated with different source data dictionaries differ by less than a threshold amount.

* * * * *